Dec. 6, 1955 G. E. CRAWFORD 2,725,650
BULLDOZER FRAME
Filed Nov. 17, 1952 3 Sheets-Sheet 1
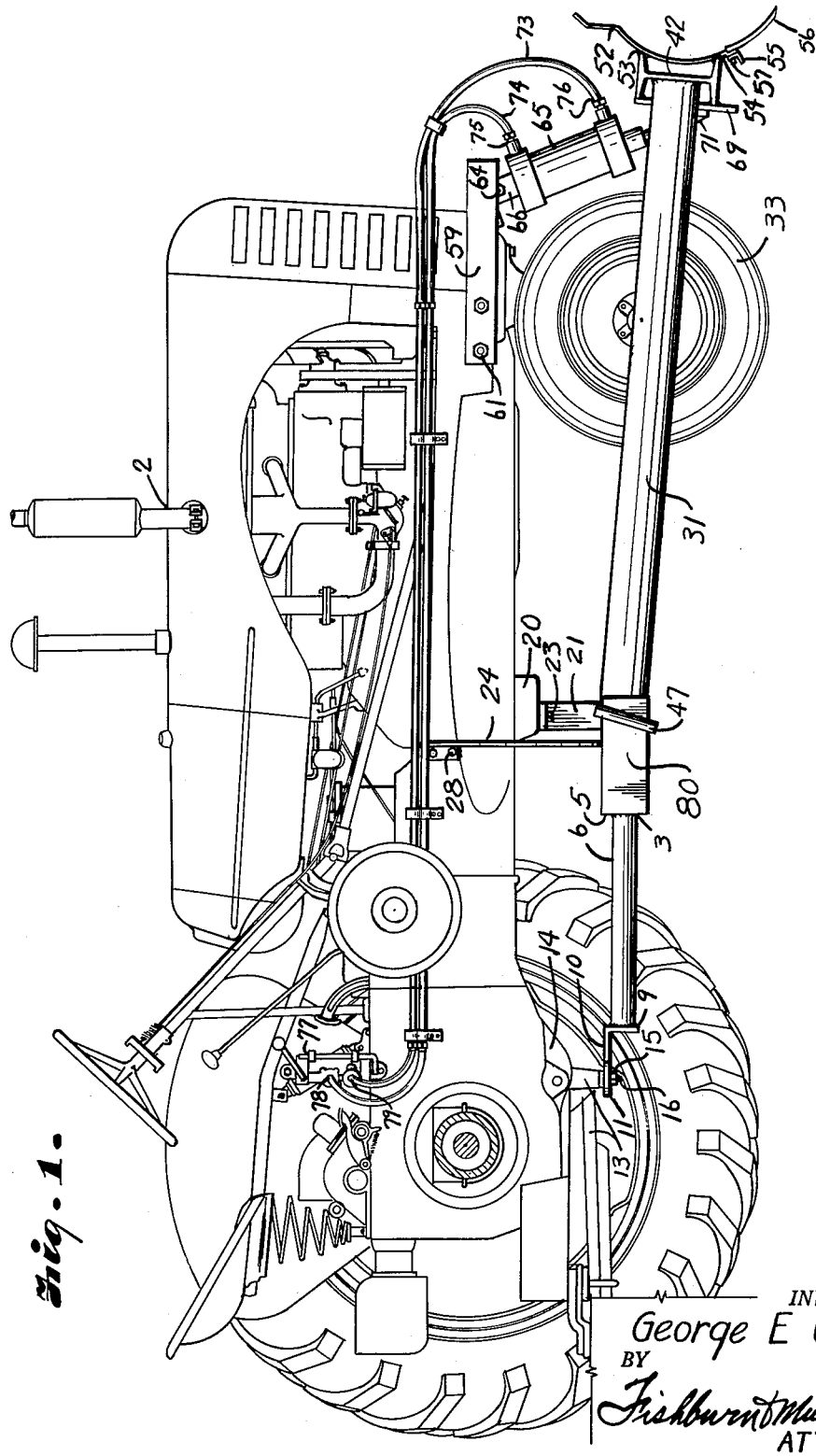
INVENTOR.
George E Crawford.
BY
Fishburn&Mullendore
ATTORNEYS.

Dec. 6, 1955  G. E. CRAWFORD  2,725,650
BULLDOZER FRAME
Filed Nov. 17, 1952  3 Sheets-Sheet 2
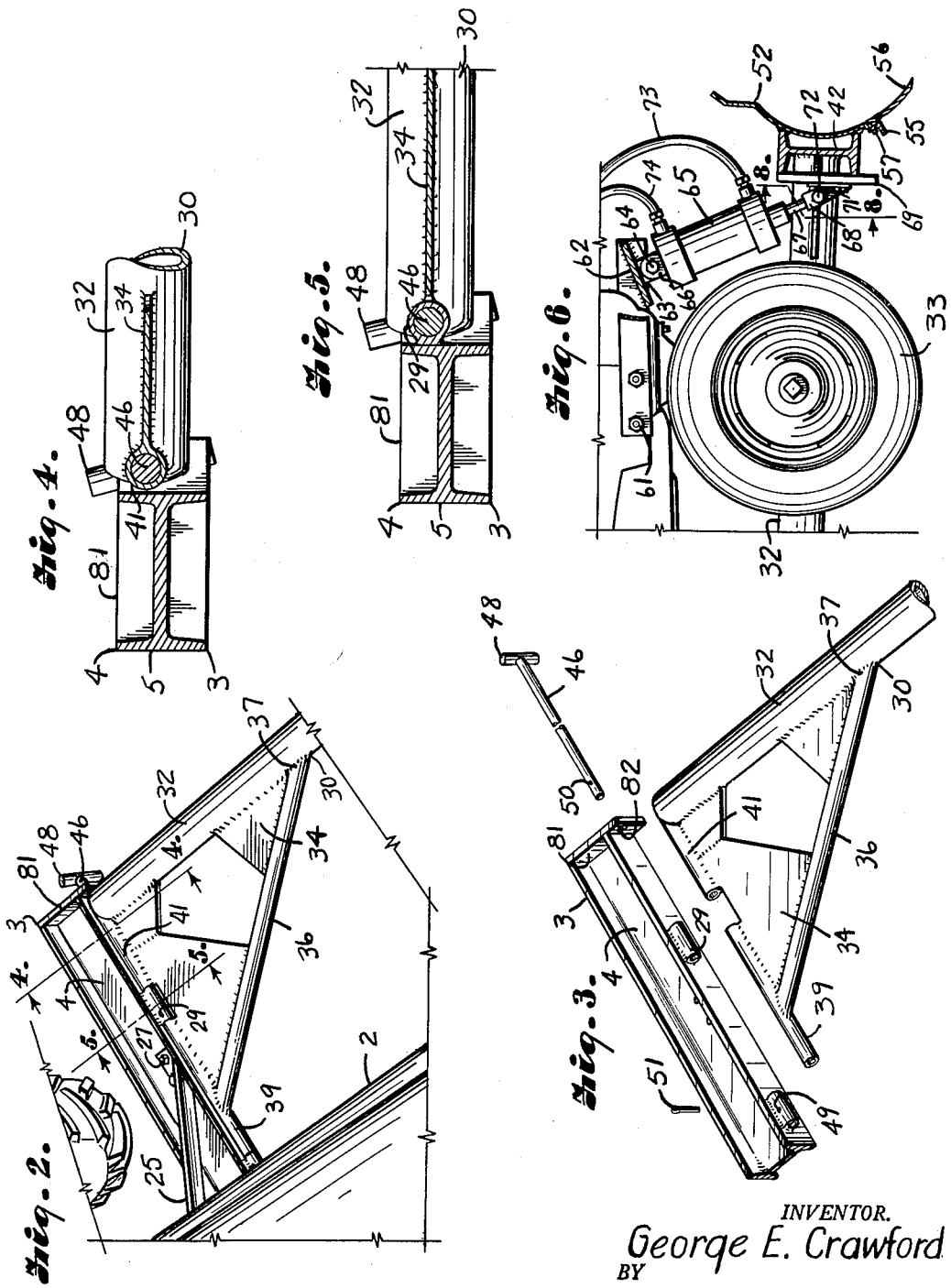
INVENTOR.
George E. Crawford
BY
Fishburn & Mullendore
ATTORNEYS.

Dec. 6, 1955

G. E. CRAWFORD 2,725,650

BULLDOZER FRAME

Filed Nov. 17, 1952

INVENTOR.
George E. Crawford
BY
Fishburn Mullendore
ATTORNEYS.

United States Patent Office 2,725,650
Patented Dec. 6, 1955

2,725,650

BULLDOZER FRAME

George E. Crawford, Laverne, Okla.

Application November 17, 1952, Serial No. 320,995

2 Claims. (Cl. 37—144)

This invention relates to a bulldozer frame, and more particularly to a detachable frame for a tractor or the like for mounting of a blade of the bulldozer type.

The principal objects of the present invention are to provide a structure to take the perpendicular thrust of the beam of the bulldozer; to provide a frame adapted to be rigidly attached to the draw bar of the transmission housing and to the clutch housing; to provide a push bar or bulldozer frame structure pivotally mounted on the first frame structure which extends forwardly of the tractor and upon which forward end the bulldozer blade is mounted; to provide for attachment of the forward end of the push bar frame structure to the frame of the tractor; to provide hydraulic means operable from the fluid pressure of the tractor, attached to the forward end of the push bar or bulldozer frame structure and to said tractor for raising and lowering the bulldozer blade; to provide a structure of this character for preventing of twisting of the frame work due to strains placed on the bulldozer blade in any position while in use; to provide for bracing of the main frame work structure to the side of the clutch housing of the tractor, and to provide a device of this character, simple and efficient in operation.

In accomplishing these and other objects of the present invention I have provided improved details of structure, the preferred forms of which are illustrated in the accompanying drawings, wherein:

Fig. 1 is a side view of a tractor showing my improved bulldozer frame attached thereto.

Fig. 2 is a fragmentary view showing the strut arrangement of the push bar structure and its attachment to the main frame.

Fig. 3 is a fragmentary disassembled view of the structure housing in Fig. 2.

Fig. 4 is a detailed cross section of the frame taken on a line 4—4, Fig. 2.

Fig. 5 is a view similar to Fig. 4, taken on a line 5—5, Fig. 2.

Fig. 6 is a fragmentary side view partly in cross section illustrating the hydraulic cylinder for raising and lowering the bulldozer blade and its attachment to the frame.

Figure 8:
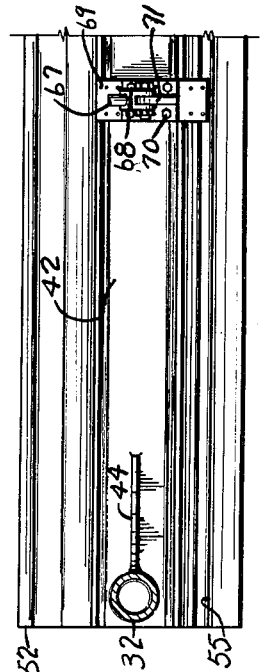
Fig. 8 is a fragmentary cross sectional view particularly illustrating mounting of the bulldozer blade to the push bar frame.

Referring more in detail to the drawing:

1 designates a frame construction embodying the features of my invention and adapted to be removably attached to a tractor or other vehicle 2. The device consists of a frame 3 comprising a transverse I-beam 4 positioned on its side and having attached to the rear flange 5 thereof brace arms 6 and 7 and a center arm 8. The braces and arm are secured to the flange of the I-beam by welding or the like. The rear ends of the braces 6 and 7 and arm 8 are secured by welding or other suitable means to a flange of a cross arm 9 of angle shape and to the other flange 10 of the angle portion at the center thereof 10, is secured by welding a lug or the like 11 having an opening 12 for attaching the rear end of the frame to a draw bar secured to the differential housing 14 of the tractor or the like and held thereon by the nut 15 on the threaded portion 16. Extending forwardly from the forward flange 17 of the I-beam 4 is a lug 18 having an opening 19.

The lug 18 is adapted to be secured to the clutch housing 20 of the tractor by a bracket arm or the like 21, the bracket arm being secured to the lug 18 by a bolt 22, and the upper end of the bracket arm being secured to the clutch housing by a cap screw as indicated at 23 (Fig. 1).

In order to form a more rigid structure of the frame and the fastening thereof to the tractor I provide brace arms 24 and 25 having one end rigidly secured to the I-beam 4 as indicated at 26 and 27 and extending upwardly at an angle and the opposite ends are attached to the tractor frame on either side as by cap screws or other suitable means as indicated at 28 (Fig. 1).

It will thus be seen that the frame 3 is rigidly secured to the tractor at its forward center to the clutch housing of the tractor and its rear end to the draw bar of the tractor extending beneath the differential housing.

Figure 7:
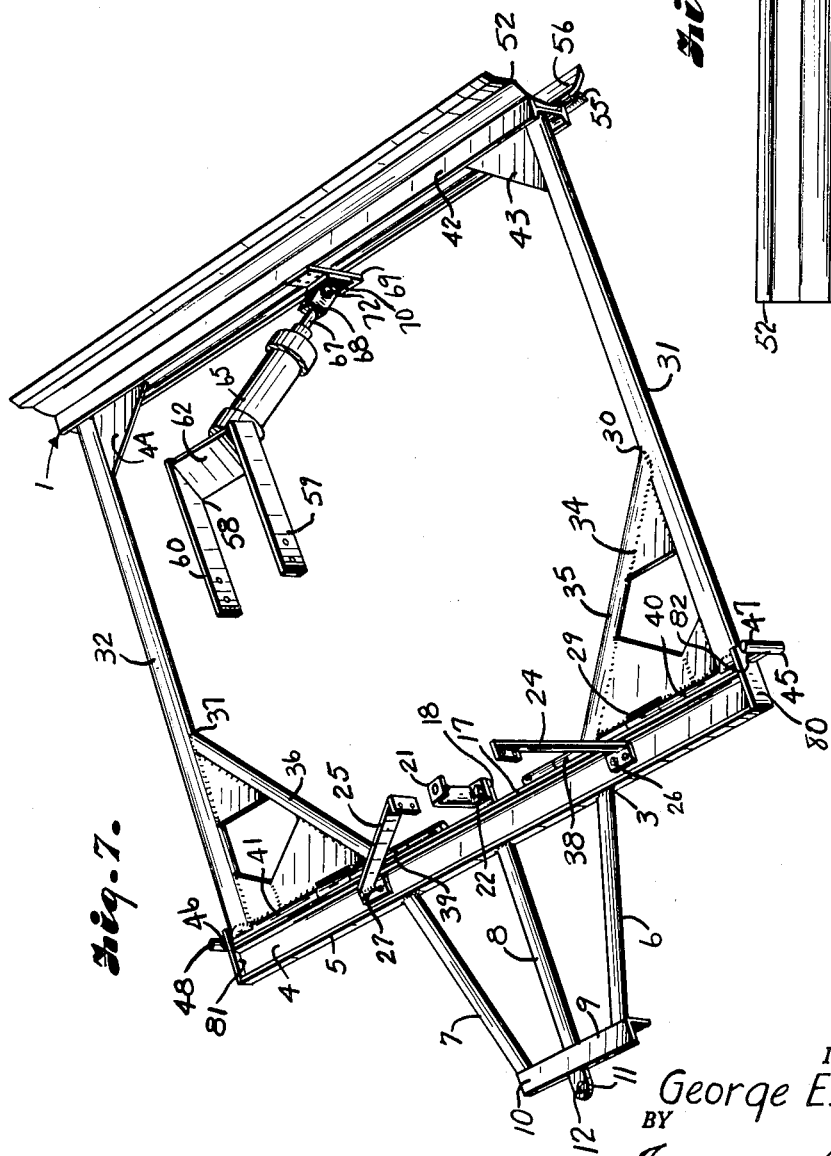
Fig. 7 is a perspective view of the bulldozer frame alone.

Welded or otherwise suitably secured to the forward flange 17 of the I-beam 4 are a plurality of spaced sleeves 29 extending inwardly from the respective ends of the I-beam a substantial distance as best illustrated in Figs. 2, 3 and 7. Adapted to be pivotally attached to the sleeves 29 is a bulldozer frame 30 comprising push arms 31 and 32 extending forwardly from the ends of the I-beam 4 alongside the tractor and on the outside of the front tractor wheels 33 and forwardly thereof.

The rear ends of the push bars 31 and 32 are provided with struts 34 comprising arms 35 and 36 having one end welded to the push arms as indicated at 37 and the other ends are secured by welding or other suitable means to sleeves 38 and 39. Sleeves 40 and 41 are also rigidly secured by welding or other suitable means to the rear ends of the push arms 31 and 32. The sleeves being adapted to align with the sleeves 24 welded to the front portion of the I-beam 4.

An I-beam 42 is welded or otherwise rigidly secured to the front end of the push arms 31 and 32, the eye beam being in vertical position and gussets 43 and 44 are rigidly secured in the respective corners of the forward ends of the frame 30 to provide a rigid structure.

To pivotally attach the bulldozer frame 30 to the frame 3 I provide pins 45 and 46 having heads 47 and 48 on the ends thereof. The pins are adapted to engage in the respective sleeves on the forward edge of the I-beam 4 and the rear end of the push arms 31 and 32 and struts 33 and 34. Openings 49 may be provided in the sleeves 24 on the forward edge of the I-beam 4 and openings 50 in the pins to accommodate cotter pins or the like 51 to retain the pins 45 and 46 in place.

A moldboard 52 is welded to the respective flanges of the vertical I-beam 42 on the front end of the bulldozer frame 30 as indicated at 53 and 54. The moldboard has an angle member 55 secured to the lower edge thereof and a blade 56 is secured to the moldboard by bolts or the like 57 as indicated in Fig. 6.

A yoke 58 is provided for attachment on each side of the front of the tractor frame by arms 59 and 60 by bolts as indicated at 61 (Fig. 6). The yoke has a cross arm 62 to which is secured a lug 63 having an opening for receiving a bolt 64 for attaching a hydraulic cylinder 65 to the lug 63 by means of ears 66 secured to the end of the cylinder 65. The cylinder is provided with the usual piston including a rod 67 extending from the cylinder which in turn has a yoke 68 on its end provided with aligned openings (not shown) for a purpose presently described.

Secured to the edges of the flanges on the rear of the I-beam 42 at substantially the center thereof by welding or other suitable means is a plate 69 provided with openings for receiving bolts 70 for securing the plate to the I-beam 42. The plate 69 is provided with a rearwardly extending lug 71 having an opening for receiving a bolt 72 for pivotally securing the yoke 68 to the lug. Fluid lines 73 and 74 are provided for furnishing of hydraulic fluid to the cylinder. One end of the lines are attached to the cylinder as indicated at 75 and 76 and the opposite ends are attached to a control valve 77 as indicated at 78 and 79 to supply pressure fluid to the cylinder from a source (not shown). Plates 80 and 81 are welded to the respective ends of the I-beam 4. Openings 82 are provided in said plates for receiving the pins 45 and 46 to aid in supporting the bulldozer frame 30 to the rigid frame 3.

With the structure assembled as described it will be noted that the frame 3 is rigidly secured to the tractor and the bulldozer frame is pivotally mounted to the main frame and may be detached therefrom by removal of the pins 40 and 41 and detaching the cylinder from the bulldozer frame or the cylinder may also be detached from the yoke 58 by removing the bolt 66 at the upper end of the cylinder.

With the structure assembled as described the forward movement of the tractor pushes the bulldozer blade forwardly and the depth of the cutting blade in the material being moved is regulated by operation of the hydraulic cylinder through the control valve 77. Through operation of the cylinder the blade may be raised entirely above the ground or lowered whatever distance is desired, the rear end of the bulldozer frame being pivoted to the main frame for this purpose. With the push arm construction of the bulldozer frame any strain on either end or any portion of the blade or moldboard will not cause any distortion of the frame work structure.

It will be obvious from the foregoing that I have provided an improved detachable bulldozer frame construction which may be quickly and easily attached or detached from a tractor or other vehicle and hydraulically operated from a source of supply normally carried by the tractor.

What I claim and desire to secure by Letters Patent is:

1. In combination with a tractor having a frame and draw bar, clutch housing, and a hydraulic fluid system, a bulldozer frame having push arms extending along each side of the tractor, a cross member rigidly secured to the forward ends of the push arms and extending in front of the tractor, a second cross member pivotally secured to the other ends of the push arms and extending laterally underneath the tractor, a bracket arm secured to the forward side of said rear cross member, means for attaching said bracket to the clutch housing, brace means having ends secured to said rear cross member and the other ends to the frame of the tractor for attaching the bulldozer frame to the tractor, a second frame rigidly secured to and extending rearwardly of one face of the rear cross member, said second frame having a lug extending rearwardly therefrom means for attaching said lug to the draw bar of the tractor, a moldboard including a blade rigidly secured to the forward side of the cross member on the bulldozer frame ahead of the tractor, a yoke secured to the forward end of the tractor frame, said yoke including a cross arm having a downwardly extending lug, a cylinder having one end pivotally secured to said lug, a plate rigidly secured to the rear edge of the cross member on the push bars, said plate having a lug extending rearwardly therefrom, a piston in said cylinder having a rod extending from the cylinder and having a yoke on the end thereof, means for pivotally securing said last named yoke to the lug on said plate, and hydraulic means operable from the tractor for operating the piston in said cylinder for raising and lowering said blade.

2. In combination with a tractor having a frame and draw bar, clutch housing, and a hydraulic fluid system, a bulldozer frame having push arms extending along each side of the tractor, a cross member rigidly secured to the forward ends of the push arms and extending in front of the tractor, a second cross member pivotally secured to the other ends of the push arms and extending laterally underneath the tractor, a bracket arm secured to the forward side of said rear cross member including a lug, means for attaching said bracket and lug to the clutch housing, brace means having ends secured to said rear cross member and the other ends to the frame of the tractor for attaching the bulldozer frame to the tractor, a second frame rigidly secured to and extending rearwardly of one face of the rear cross member, said second frame including a cross arm at the rear thereof, a lug extending rearwardly from the cross arm, means for attaching said lug to the draw bar of the tractor, a moldboard including a blade rigidly secured to the forward side of the cross member on the bulldozer frame ahead of the tractor, a yoke secured to the forward end of the tractor frame, said yoke including a cross arm having a downwardly extending lug, a cylinder having one end pivotally secured to said lug, a plate rigidly secured to the rear edge of the cross member on the push bars, said plate having a lug extending rearwardly therefrom, a piston in said cylinder having a rod extending from the cylinder and having a yoke on the end thereof, means for pivotally securing said last named yoke to the lug on said plate, and hydraulic means operable from the tractor for operating the piston in said cylinder for raising and lowering said blade.

References Cited in the file of this patent

UNITED STATES PATENTS

| Number | Name | Date |
|---|---|---|
| 2,213,635 | Miller et al. | Sept. 3, 1940 |
| 2,242,472 | Keeler | May 20, 1941 |
| 2,377,112 | Strunk | May 29, 1945 |
| 2,494,684 | Best | Jan. 17, 1950 |
| 2,522,283 | Remington | Sept. 19, 1950 |
| 2,559,816 | Alexander | July 10, 1951 |